July 8, 1952
G. L. CUNNINGHAM
2,602,750
METHOD FOR EXTRACTING AND CONCENTRATING JUICES
Filed June 11, 1949
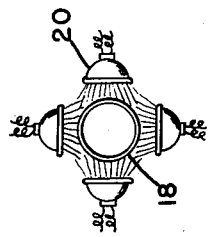
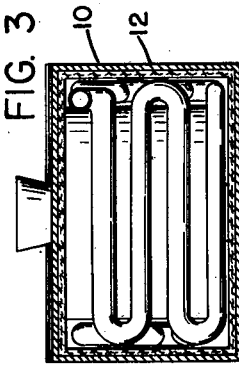
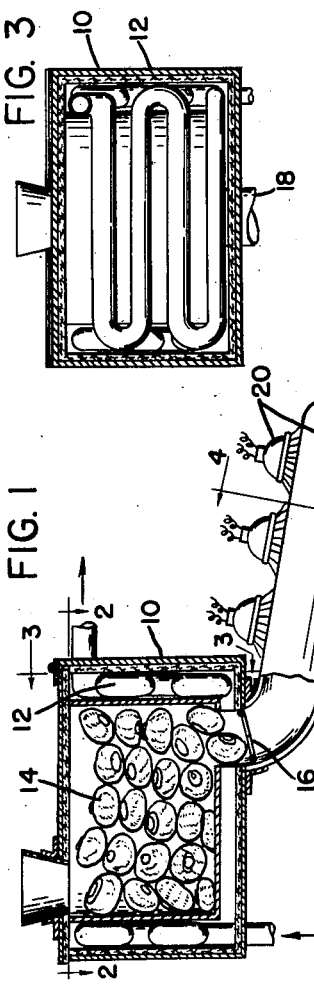
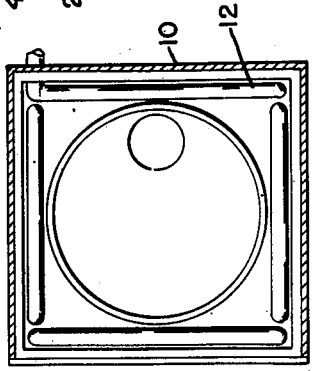
INVENTOR
GEORGE L. CUNNINGHAM
By Toulmin & Toulmin
ATTORNEYS.

Patented July 8, 1952

2,602,750

UNITED STATES PATENT OFFICE 2,602,750

METHOD FOR EXTRACTING AND CONCENTRATING JUICES

George L. Cunningham, Cincinnati, Ohio, assignor to The Commonwealth Engineering Company of Ohio, Dayton, Ohio, a corporation of Ohio Application June 11, 1949, Serial No. 98,614

5 Claims. (Cl. 99—205)

This invention relates to the extraction of juices from fruits and vegetables, and particularly in connection with fruits and vegetables characterized by a more or less cellular structure, such as onions.

The extraction of juices from fruits and vegetables is a process having considerable commercial significance and value, but heretofore most juice extracting has been by means of pressing the fruit or vegetable from which the juice is to be extracted and thereby separating the juice from the pulp. After this has been done, the juice can be concentrated in a desirable manner in order to arrive at the product desired.

One difficulty experienced with this type of extraction is that it is practically impossible to extract all of the juice from certain fruits and vegetables due to the fact that their structure is rather cellular, and some of the cells resist crushing by the mere application of pressure.

Another objection is that great pressures are required, and it is sometimes impractical to set up the apparatus for developing such high thrusts. Still another objection to the extraction of concentration of juices from fruits and vegetables according to prior art processes, is that ordinarily heat is employed in connection with the concentrating of the juices that have been extracted, and this tends to change the flavor of the juices so that they are not as palatable as originally.

The primary object of this invention is to provide an improved method and apparatus for extracting and concentrating juices from fruits and vegetables, such as onions and the like, which leads to a superior product.

Still another object is the provision of a method and apparatus for extracting juices from onions and the like which is highly efficient with regard to the amount of available juice which is extracted.

A particular object of this invention is to utilize the freezing of the articles being processed for breaking the cellular structure thereof in order to accomplish a greater efficiency of juice extraction.

It is also a particular object of this invention to provide a method and apparatus for extracting juices from onions and the like which involves a combination of freezing, thawing, pressing, and concentrating the juices by freezing which results in a product that is highly uniform and which can be diluted to its original consistency and without any loss in flavor or aroma.

These and other objects and advantages will become more apparent upon reference to the following description taken in connection with the accompanying drawings, in which:

Figure 1 is a more or less diagrammatic layout showing the process of this invention as applied to extracting the juice from onions;

Figure 2 is a plan view indicated by line 2—2 on Figure 1 and showing the freezer wherein the onions are originally frozen hard;

Figure 3 is a vertical section looking in at the end of the freezing compartment of Figure 1; and Figure 4 is a sectional view indicated by line 4—4 on Figure 1 and illustrating the thawing station where the onions are thawed after being frozen.

The process according to this invention may be generally stated as follows:

The articles from which the juice is to be extracted are first frozen solid. In the case of onions, the temperature is reduced to about 30 degress below zero Fahrenheit.

After the onions, or whatever article is being treated, have been frozen solid for a predetermined length of time, they are then thawed a predetermined amount. This freezing and thawing of the articles results in a complete breaking up of the internal structure thereof. In the case of onions and other cellular fruits and vegetables, this freezing and thawing is effective for rupturing or at least weakening each and every juice containing cell therein, so that subsequently the cells can readily be broken and the juice extracted therefrom.

It might be pointed out that the freezing is preferably a slow freezing process as distinguished from what is known as rapid freezing or fast freezing according to present-day methods of freezing fruits, vegetables, meats, and the like, for preserving them. In fast freezing, the freezing process is carried out so rapidly that the ice crystals formed are very small and there is not much breakage of the cellular structure of the article being frozen. This process contemplates freezing at such rate that ice crystals can grow and, accordingly, will rupture, or at least weaken, the cellular structure, so that upon thawing the juice can readily be extracted.

The thawed fruit or vegetable is next macerated or cut up very finely in any suitable sort of device, which may, for example, be similar to the ordinary meat grinder.

This grinding up of the material is effective for breaking or rupturing substantially all of the juice containing cells which are not broken during the thawing and freezing process, and the juice is, accordingly, released from the solids or pulp.

After the grinding up of the material, it is passed through a blending unit wherein the substance is thoroughly blended and made homogeneous. The substance is then conveyed from the blender to the pressing unit.

The substance at this time is still cold, although the temperature has been raised sufficiently for a general thawing of the substance, and is in at least a semi-liquid state due to the action of the macerating unit and the blending unit. This semi-liquid is then delivered from the blender to a pressing station and is subjected to pressure. Due to the fact that most of the cells of the original fruit or vegetable have been broken down or cut up, either due to the freezing or thawing action, or combination thereof with the macerating and blending action, the juice in the substance readily separates from the pulp and solids thereof. The juice so separated from the pulp and solids of the substance is then passed through a multiple stage freezing unit, wherein the juice flows through the unit in one direction while being chilled to the point of freezing and the ice crystals formed due to the freezing pass through the unit in the opposite direction. This unit thus removes the water from the juices, expelling the water from one end of the unit as ice, and the juices in highly concentrated form from the other end of the unit.

The expelled juices will have a certain amount of ice entrained therein, and are preferably centrifuged after leaving the freezing unit, thereby further concentrating and purifying the product. The ice discharged at the opposite end of the unit has entrained therein a considerable amount of the juice being concentrated, and it is also preferably centrifuged and the liquid thus removed from the ice refluxed into the freezing unit and passed therethrough. The ice from which the juice is centrifuged is, of course, waste.

Referring now to the drawings, there is shown in Figure 1 a freezing unit 10 comprising an insulated enclosure about which are arranged the pipes 12 through which refrigerant can be passed for freezing the onions therein, indicated at 14. There is a gate at 16 at the bottom of the freezing compartment, and this opens into a tunnel or channel 18 through which the onions pass during the thawing cycle. The tunnel 18 may be heated in any suitable manner, and there are shown the heat lamps 20 which are connected with a suitable source of electric current, as is well-known in the art. At the right end of the tunnel 18, the now-thawed onions fall into the hopper 22 or the macerating unit 24 which includes a screw 26 that may be driven as by the belt 28. In passing through the macerating unit, the onions are completely cut up and issue from the right end of the macerator as a rather slushy and semi-liquid substance.

The substance which leaves from the right end of the macerator passes into a blending unit 30 which thoroughly homogenizes the substance, both as to texture and temperature; and then discharges it through the outlet conduit 32 into the chamber 34 of a pressing station including a ram 36 that may be driven by the fluid motor generally indicated at 38.

Due to the fact that the substance introduced into chamber 34 is completely blended and homogenized, and has all its individual cells either ruptured or weakened by the freezing or macerating or thawing action, or a combination thereof, the juice in the substance is readily separated from the solid parts thereof. This juice is delivered through a discharge conduit 40 into the first stage of a multiple stage freezing and separating unit, generally indicated at 42.

This multiple stage freezing and separating unit comprises a plurality of serially arranged arcuate trough-like chambers 44, which are arranged so that the fluid is introduced at the left end of the unit and passes in cascade through the several individual compartments thereof to the right end of the unit.

In each of the compartments 44, there is a swinging screened barrier 46. These barriers are connected by the parallel motion linkage 48 to move in unison and are also connected with a crank arm 50 which supports the linkage in an upright position. Each screened barrier 46 has connected thereto a drive arm 52 that is connected by the gearing 54 with drive shaft 56 of a drive motor 58. In operation, the juices leaving the end of conduit 40 pass into the first of compartments 44 and flow therethrough into the second of compartments 44, and so on through as many compartments as are in the unit to the right end thereof. During the passage of the juices through the unit, the screened barriers 46 operate for continuously urging ice particles which form within the chambers leftwardly so that they fall out the chute indicated at 60 at the extreme left-hand end of the unit 42.

The compartments in the freezing unit are maintained at successively lower temperatures from left to right, so that in each compartment the temperature is such that there will be a formation of ice crystals therein. As the ice crystals flow along with the liquid, they form a nucleus about which larger and larger crystals grow until the crystals reach a size that they will be engaged by the screened barriers and moved thereby toward the left end of the machine.

As the juices pass rightwardly through the freezing unit, it will be seen that they become more and more concentrated, and that it is only necessary to provide the proper number of chambers 44 to obtain any desired concentration of juice issuing from the right-hand end of the freezing unit.

The juices which exit from the right-hand end of the freezing unit enter a centrifuge, indicated at 62, and which is driven by motor 64. In this centrifuge, the ice which may be entrained with the concentrated juices is removed therefrom, and the pure product is discharged from the centrifuge as at 66. At the left end of the machine, the ice crystals falling down chute 60 enter centrifuge 68, and the juice which is entrained with the ice is separated therefrom in this centrifuge and discharges from the centrifuge as by means of the discharge opening 70. This fluid is pumped by a pump 72 through conduit 74 and is refluxed by being reintroduced into the freezing unit in the first compartment 44. A motor 76 may be provided for pump 72, and a motor 78 for centrifuge 68.

It will be apparent that, while the method and apparatus of this invention could be utilized in connection with any fruit or vegetable, it is particularly well adapted to the extraction of juice from onions and similar fruits and vegetables having cellular structures.

It will be understood that this invention is susceptible to modification in order to adapt it to different usages and conditions, and, accordingly, it is desired to comprehend such modifications within this invention as may fall within the scope of the appended claims.

I claim:

1. In a method of extracting juices from cellular articles, comprising, freezing the edible cellular articles solid, partially thawing the frozen cellular articles, macerating the thawed cellular articles while still partially frozen, blending the macerated substance of the cellular articles to a flowable homogenous liquid, pressing the substance homogenized by blending to separate the juices therein from the solids, freezing the juices to solidify the water therein and separating the resulting ice from the juices, centrifuging the separated ice to extract therefrom the juices entrained therein, and refluxing the juices separated from the ice by introducing it into the juices being frozen.

2. A method of extracting and concentrating juices from edible cellular articles which comprises: freezing the edible cellular articles solid, thawing the cellular articles partially, macerating the cellular articles to a pulpy mass while still partially frozen, pressing the macerated mass to separate the juices from the solids thereof, reducing the temperature of said juices until ice crystals commence to form therein, and moving the ice crystals and juices in counterflow thereby removing water from the juices and concentrating the juices, and progressively reducing the temperature to which the juices are subjected in the direction of flow thereof.

3. A method of extracting and concentrating juices from edible cellular articles which comprises: freezing the edible cellular articles solid, thawing the cellular articles partially, macerating the cellular articles to a pulpy mass while still partially frozen, blending the mass to a flowable partially liquid substantially homogeneous as regards temperature and texture, pressing the blended mass to enforce a separation of the juices from the pulp and solids therein, reducing the temperature of the said juices to commence the formation of ice crystals therein, and moving the ice crystals and juices in counterflow relationship thereby removing water from the juices and progressively reducing the temperature to which the juices are subjected in the direction of flow thereof.

4. A method of extracting and concentrating juices from edible cellular articles, which comprises freezing the edible cellular articles solid, partially thawing the cellular articles, macerating the cellular articles to a pulpy mass while still partially frozen, pressing the macerated mass to separate the juices from the solids thereof, and concentrating the juice of the article by freezing the water in the juice to form ice crystals and removing the ice crystals.

5. A method of extracting and concentrating juices from edible cellular articles, which comprises slowly freezing the edible cellular articles solid, partially thawing the cellular articles, macerating the cellular articles to a pulpy mass while still partially frozen, pressing the macerated mass to separate the juices from the solids thereof, and concentrating the juice of the article by freezing the water in the juice to form ice crystals and removing the ice crystals.

GEORGE L. CUNNINGHAM.

REFERENCES CITED

The following references are of record in the file of this patent:

UNITED STATES PATENTS

| Number | Name | Date |
| --- | --- | --- |
| 1,636,890 | Zorn | July 26, 1927 |
| 2,322,791 | De Back | June 29, 1943 |
| 2,377,853 | Boyer | June 12, 1945 |

FOREIGN PATENTS

| Number | Country | Date |
| --- | --- | --- |
| 436,292 | Great Britain | of 1935 |